Patented Aug. 25, 1953

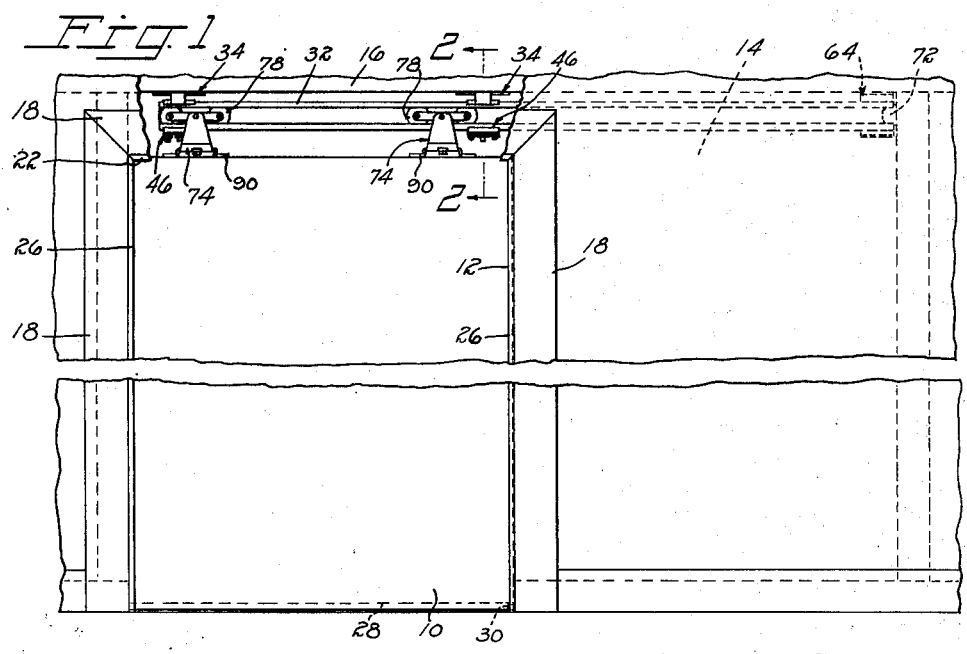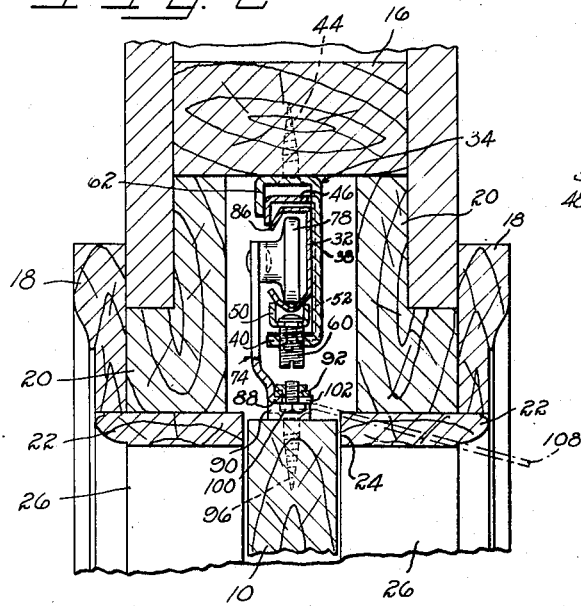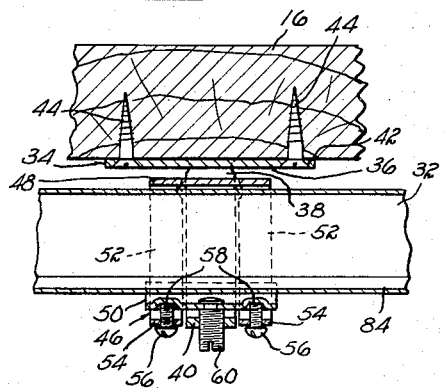

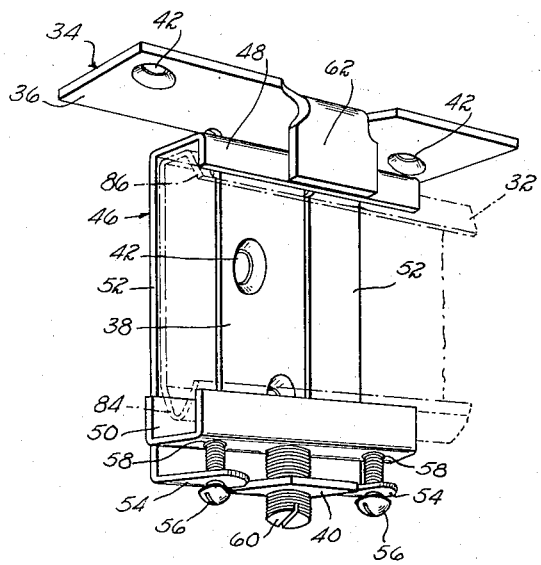

2,649,612

UNITED STATES PATENT OFFICE 2,649,612

TRACK AND BRACKET

Austin C. Loomis, Plainville, Conn., assignor to The Stanley Works, New Britain, Conn., a corporation of Connecticut Application September 8, 1949, Serial No. 114,509

7 Claims. (Cl. 16—94)

This invention relates to improvements in door supporting means and, more particularly, to means for supporting a door in suspended relation for sliding movement into and out of closed position relative to a doorway. A track is usually employed to support doors of this nature, the track being supported in the header of a door frame outlining the doorway, the header having a slot in the lower surface thereof which slidably receives the upper end of the door. If a single door is used, said door usually slides in one direction into a recess in a wall adjacent the doorway and the track supporting the door also extends backward into said recess.

When presently available track supporting means are employed, the installation thereof usually occurs before the face molding or trim of the doorway is attached to the door frame, whereby the bracket supporting the track may be readily installed in operative position. However, when the face molding is mounted relative to the door frame it is usually impossible to adjust the track relative to the door frame without removing some of the molding and/or part of the door frame in order to adjust the track for purposes of correcting any misalignment of the door relative to the door frame due to warping or shrinkage.

It is an object of the present invention to provide means for supporting a track for a sliding door by bracket means which are capable of vertical adjustment by inserting through the slot in the doorway header a tool such as a screw driver and manipulating thereby the brackets from beneath the same for purposes of vertically adjusting the track relative to the header in order that the position of a door supported by said track may be varied relative to the door frame.

It is another object of the invention to provide means for supporting one end of the track when extending into the wall cavity and adjustable brackets positionable within the header above the doorway opening, whereby said adjustable brackets are readily capable of manipulation for purposes of vertically adjusting the track irrespective of the engagement between said first mentioned end of the track and means supporting the same, the track preferably being slightly flexible for this purpose.

Still another object of the invention is to provide a sliding door track and supporting means therefor which are simple in construction, which may be economically manufactured, which may be easily and quickly installed and adjusted and which are strong and durable.

Details of these objects and of the invention, as well as other objects thereof, are set forth in the following specification and illustrated in the accompanying drawings forming a part thereof.

In the drawings:

Fig. 1 is an interrupted front view of a door frame and adjacent wall section relative to which door supporting means embodying the present invention are mounted.

Fig. 2 is a fragmentary vertical section of a door frame header taken on line 2—2 of Fig. 1 and illustrated on a larger scale than in Fig. 1.

Fig. 3 is a fragmentary sectional front view of a track supporting bracket assembly embodying the principles of the present invention.

Fig. 4 is a perspective view of the track supporting means shown in Fig. 3.

Fig. 5 is a perspective view of the means for supporting one end of said track which is usually disposed within the wall cavity which receives the sliding door when the doorway is open.

Fig. 6 is a fragmentary sectional front view of a hanger assembly by which a sliding door is supported within the track.

Fig. 7 is a perspective view of the bracket per se of the invention.

Fig. 8 is a perspective view of one of the track holder clamping members per se.

In describing the present invention, it is to be understood that the views shown in the accompanying drawings illustrate one exemplary doorway and wall construction relative to which the sliding door track and supporting brackets embodying the present invention may be mounted. In this exemplary illustration, a single door 10 has been shown for sliding movement from the position illustrated in Fig. 1 wherein it closes the doorway opening 12 to an open position wherein the door will be disposed within a cavity 14 within the wall adjacent the doorway opening 12. The invention may be readily applied to other types of door and doorway arrangements such as where two doors are slidable relative to each other for purposes of closing a doorway without being moved into a wall cavity or recess as shown in Fig. 1. Various multiples of these arrangements are also possible, depending upon how many doors are desired and the disposition thereof for closing a doorway opening within a wall.

The exemplary illustration in the present drawings shows the doorway opening 12 outlined by a door frame including a header 16 positioned above the doorway opening 12. The doorway is finished by conventional stock face molding or trim strips 18 attached to the door frame and overlapping the wall surfaces adjacent the doorway opening. The header also includes spaced side members 20. Secured to the lower surfaces of the side members 20 are horizontal trim strips 22 which are spaced apart to provide a door slot 24 between the adjacent inner edges of the strips 22. The door frame is also finished on the sides by similarly spaced vertical door stop strips 26. If desired, the bottom surface of the door 10 is provided with a vertical groove 28 which may receive an upstanding guide bracket 30 which can be affixed to the floor to prevent engagement between the door and the stop strips 26 when the door is slidably moving relative to said strips.

The track 32 is illustrated as being C-shaped in cross-section and is provided in any suitable length depending upon the width of the doorway. Said track is supported within the header and, in the embodiment shown in Fig. 2, between the side members 20 of the header. Said track is supported by an assembly comprising a bracket 34 having a horizontal flange 36 from one side of which a leg 38 depends, the lower end of the leg terminating in a horizontal member or flange 40. A relatively short arm 62 depends from the other side of flange 36. The flange 36 and leg 38 are provided with suitable apertures 42 adapted to receive screws for securing the bracket to suitable portions of the header. In the illustrated embodiment, the bracket 34 is secured to the header member 16 by screws 44 inserted through the apertures 42 in the flange 36.

Supported by the bracket is a track holder or clamp assembly 46 comprising a pair of channel-like track clamping members 48 and 50. Depending from the upper member 48 are a pair of strap-like arms 52 which extend below the lower member 50 and terminate in horizontal extensions 54 which are threadably apertured to receive vertically disposed screws 56, the upper ends of which are disposable in aligning cavities 58 formed in the lower surfaces of the member 50 as clearly illustrated in Fig. 3. As is readily seen from Figs. 2, 3 and 4, rotation of the screws 56 in one direction will vertically move the member 48 downward toward the member 50, whereby member 48 abuts arm 62 and wedgingly engages downward extending flange 86 of track 32 so as to force the track against leg 38 and also downward so that lower channel portion 84 of the track is wedged into engagement with the upper edges of the sides of channel member 50 as shown in Figs. 2 and 4. When said screws 56 are tightened, the track will thus be securely and wedgingly clamped between the members 48 and 50 and leg 38. It will be noted that the heads of the screws 56 are on the lower ends thereof whereby the screws may be manipulated from beneath the track holder 46 by a screw driver inserted upward through the door slot 24 in the header. Also, it will be seen that rotation of the screws 56 in a direction reverse to that mentioned above will serve to loosen the same relative to the lower member and permit the upper member 48 to be moved upward away from the member 50. When the members 48 and 50 are moved sufficiently apart, the track may be readily removed from between the same in a lateral direction toward the left, as viewed in Fig. 2.

Swivelly connected to the lower member 50 and depending therefrom intermediate the ends thereof is a vertically mounted screw 60. Said screw extends through a threaded aperture in the horizontal member 40 of the bracket 35 and the lower end of the screw 60 is slotted so as to be engageable from beneath the bracket by a screw driver inserted upward through the door slot 24. After the track 32 has been securely clamped between the members 48 and 50 comprising the track holder 46 and the leg 38 of bracket 34, rotation of the screw 60 in opposite directions will serve to adjust the track in a vertical direction upward or downward relative to the bracket 34 and, correspondingly, the header and doorway. The track holder will be guided at its lower end relative to the bracket 34 by the engagement of the screw 60 with the horizontal member 40. The upper end of the track holder 46 will be guided at one side by engagement of the side of the track 32 with the leg 38 of the bracket, and at the other side by engagement of the depending flange of the upper member 48 of the track holder with an arm 62 depending from the flange 36 of the bracket 34.

The end of the track which is remote from the doorway is supported by supporting means 64. Said means has parallel top and bottom flanges 66 which are provided with screw receiving apertures 68. The flanges 66 are disposed horizontally when mounted within the header between the side members 20 thereof in the illustration shown in Figs. 1 and 2. The flanges 66 are connected by a web member 70 and one end 72 thereof is bent upon itself to provide a clip-like means which yieldably but tightly engages the central portion of one end of the track 32 in such a way as to prevent horizontal movement of the track in a direction perpendicular to the web 70 and the vertical dimension of the end 72 of the supporting means 64 is such that only very slight vertical movement of the end of the track is possible relative thereto. To mount the track in the supporting means 64, one end of the track 32 is simply slidably moved between the web 70 and the end 72 of the means 64.

In the exemplary construction shown in Fig. 1, two of the brackets 34 and the track holder members 46 are mounted within the header so as to be disposed directly above the doorway opening 12 but adjacent the sides thereof, whereby the screws 56 and 60 of the brackets and track holders may be readily manipulated by means of a screw driver inserted upwardly from beneath the bracket. Sufficient space is provided between the left-hand side member 20 of the header and the brackets to permit insertion of the track into the holders 46. To mount the track in the header, the member 48 is hung on member 50 and the track 32 is inserted into the wall cavity and into partial engagement with supporting means 64 so that the end of the track is between the top and bottom flanges 66 of means 64 but not between the web 70 and the end 72 of means 64. The track is then inserted under members 48 and moved upward until the bottom can be placed in member 50. The track is then slidably moved between the web 70 and the end 72. The screws 56 are then tightened to clamp the track between these clamping members of the holder 46. After the track holders of both brackets have had the track secured thereto, the adjusting screws 60 of the brackets are then rotated from beneath the brackets to adjust the track vertically relative to the brackets and header.

The door 10 is supported at its upper edge from the track 32 by means of a carrier assembly 74 comprising a carrier member 76 to the upper end of which either a single roller 78 may be rotatably connected or, as illustrated in Figs. 1 and 6, a horizontal bar 80 may be pivotally connected to the upper end of the carrier member 76 by a headed pin 82. A pair of rollers 78 are respectively connected to the opposite ends of bar 80, as shown in said figures. The C-shape formation of the track 32 includes a lower channel portion 84 which receives the rollers 78 and inturned flange 86 at the top of said track prevents the rollers 78 from moving laterally from the track 32. The shape of the rollers is such that they will freely roll within the channel portion 84 of the track as can be readily seen from Fig. 2. After the track is mounted in the brackets and holders as explained above, the rollers 78 of the carrier 76 are inserted within the track from the end thereof which is in the header above the doorway.

The carrier member 76 terminates at its lower end in a horizontal flange 88 which functions similarly to a hook. Cooperating with the carrier member 76 is a bracket 90 formed from strip stock and, as viewed in Fig. 6, has its central portion 92 parallel to but spaced above the end flanges 94 which extend in opposite directions from the central portion 92. The end flanges 94 are provided with suitable screw apertures to receive screws 96 by which the bracket 90 is secured to the top surface of the door 10. The central portion 92 of the bracket is apertured. Fixed to said aperture, by swaging or otherwise, is an internally threaded member or nut 98 threadably receiving a bolt 100 having its head on the lower end thereof. The hook-like flange 88 of the carrying member 76 is inserted beneath the central portion 92 of bracket 90, said flange 88 having a slot 102 extending inward from one side for purposes of receiving the bolt 100. The flange 88 and central portion 92 are also provided with interengaging aligning means comprising apertures 104 and projections 106 which serve to align the bracket 90 and carrier assembly 74 in parallel relationship when interengaged, as clearly shown in Figs. 2 and 6.

As stated above, the track is clamped in place within the header, and the carrier members 76 are assembled within the track by disposing the rollers 78 thereof within the track. At this time, the face molding strips 22 and door stop strips 26, as viewed in Fig. 2, are not mounted in their operative positions, whereby the door 10 may be inserted within the doorway. Prior to such insertion, the brackets 90 are secured to the top of the door 10. When inserting door 10 within the doorway, the door is slightly elevated above the floor so as to permit the hook-like flanges 88 of the carrier members 76 to be placed beneath the central portions 92 of the brackets 90 fixed to the door.

The door will then be supported in suspension from the carrier assemblies 74 which are supported by the track 32. When the central portion 92 of the bracket 90 and flange 88 on the carrier member 76 of each carrier assembly are interengaged, the aligning means 104 and 106 thereof will also be interengaged and the bolts 100 are disposed within the slots 102. Since the nuts 98 are fixed to the brackets 90, it is only necessary to tighten the heads of the bolts 100 of the carrier assemblies 74 against the under surfaces of the flanges 88 of the carrier assemblies to securely lock the brackets 90 and carrier members 76 in assembled relationship. Manipulation of the nuts 100 may be readily effected by any suitable means such as a flat wrench 108 which can be inserted for example between the upper edge of the door 10 and the lower edge of the righthand side member 20 of the header, as viewed in Fig. 2, said wrench being illustrated in dotted lines.

After the door is inserted in its operative position and the strips 22 and 26 are secured in their operative positions, as shown in Fig. 2, the door 10 may be plumbed relative to door frame, and particularly the door stop strips 26, by sliding the door into the wall cavity 14 and regulating the adjusting screw 60 of each bracket assembly so as to position the track 32 so that the door 10 will be disposed as desired. As has been stated above, the supporting means 64 will permit very slight vertical movement of the track relative thereto but since the track is preferably formed from somewhat flexible metal stock, the track may actually be flexed under some circumstances for purposes of disposing the portion between the brackets 34 above the doorway so that the door 10 will be plumb relative to the door frame. Should the door 10 become out of plumb, due to shrinkage, warpage, or otherwise, it may be plumbed easily and quickly by sliding the door into the wall cavity 14 and adjust the screws 60 of the brackets in suitable directions until the door is again plumb relative to the door frame.

In the event it is desired to subsequently remove the door from its supporting and mounting means described herein, it is only necessary to remove the right hand top strip 22 and one of the right hand door stop strips 26 extending along one side of the door, as viewed in Fig. 2, and by means of wrench 108 inserted through the space formed by the removal of strip 22, engage the nuts 100 to loosen the same and disengage the brackets 90 from the carrier members 76 by moving the door toward the right, as viewed in Fig. 2.

In the foregoing description, the screws 56 and 60 have, for simplicity, been illustrated as slotted screws operable by a conventional screw driver. However, it is to be understood that, in lieu of these, other types of screws provided with heads of geometric outline or socketed heads may be employed, the same being operable by suitable socket wrenches or "Allen" wrenches and the like.

From the foregoing, it will be seen that the invention provides a simple, rugged and durable track and supporting bracket assembly therefor which provides ease of adjustment for purposes of plumbing a door relative to a door frame or another door, either at the time of installation or thereafter, by merely inserting a screw driver upward into the door slot of the header and regulating the track supporting brackets until the door is disposed as desired relative to said door frame or other door. Further, complete removal of a sliding door from its doorway may be effected by simply removing one of the side door stop strips and an adjoining top molding strip adjacent the header. The door carriers, being formed from separable parts, may be readily disengaged by simply loosening a bolt threaded into each carrier assembly. Upon being loosened, the parts of the carriers are separated by simply moving the door sidewise through the door opening 12, such movement being possible due to said removal of one of the door stop strips 26 and the adjacent top finish strip 22.

While the invention has been illustrated and described in its preferred embodiment and has included certain details, it should be understood that the invention is not to be limited to the precise details herein illustrated and described since the same may be carried out in other ways falling within the scope of the invention as claimed.

I claim:

1. In combination, a track for supporting a door in suspended relation for sliding movement into and out of closed position relative to a doorway and adapted to be located above the door substantially in the plane thereof, brackets adapted to be secured to the frame of the doorway and above the door in horizontally spaced relation, a holder on each bracket comprising opposed members respectively engaging the top and bottom of said track and screw means engaging said members and operable from below the bracket to move the members vertically into clamping engagement with the track, and a screw rotatably connected to the lower member of each holder so as to be vertically movable therewith and also threadably connected to the associated bracket, said screw being operable from beneath the track to vertically adjust the track relative to the bracket engaged by said screw whereby said brackets and holders support the track above the doorway for vertical adjustment and against lateral movement, and said track being capable of limited flexibility in a vertical direction to permit the portions of the track associated with the respective brackets to be relatively adjusted vertically so as to align the door relative to the doorway.

2. In combination, a track for supporting a door in suspended relation for sliding movement into and out of closed position relative to a doorway and adapted to be located above the door substantially in the plane thereof, a bracket arranged to be fixably mounted above said doorway and having a portion thereof extending beneath said track, and means interconnecting said track and bracket, said means including a screw carried by said bracket portion and rotatable about a vertical axis, the screw being engageable at its lower end from beneath the bracket to rotate it and adjust the track vertically relative thereto.

3. A device for supporting a C-shaped track for sliding doors and comprising a bracket having a top portion, a leg and an arm depending from opposite edges of the top portion, the lower end of said leg having a horizontally disposed member beneath said top portion; a first clamping member having a top portion positioned between said arm and leg, a downward extending flange engageable with said arm, and a pair of depending arms straddling said leg, the lower ends of said depending arms having horizontal extensions; a channel-shaped second clamping member mounted below and in opposition to said top portion of said first clamping member; screws carried by said horizontal extensions and engageable with the underside of said second clamping member and operable to move said clamping members into clamping engagement with surface portions of the top and bottom of a track; and a screw threaded in said horizontal member on said leg and connected to said second clamping member for movement therewith and for rotatable movement relative thereto and operable to vertically adjust said clamping members relative to said bracket.

4. In combination, a C-shaped track for supporting sliding doors; a bracket for supporting said track in operative position and having a top portion, a leg and an arm depending from opposite edges of the top portion, the lower end of said leg having a horizontally disposed member beneath said top portion and said track; a first clamping member having a top portion positioned between said arm and leg and engaging surfaces of the top portion of said track, a downward extending flange engageable with said arm, and a pair of depending arms straddling said leg, the lower ends of said depending arms having horizontal extensions beneath said track; a channel-shaped second clamping member mounted below and in opposition to said top portion of said first clamping member and engaging surfaces of the bottom portion of said track; screws carried by said horizontal extensions and engageable with the under side of said second clamping member and operable to move and secure said clamping members into clamping engagement with said surfaces of the top and bottom portions of said track; and a screw threaded in said horizontal member on said leg and connected to said second clamping member for movement therewith and for rotatable movement relative thereto and operable to vertically adjust said clamping members and track relative to said bracket.

5. In combination, a bracket having an inverted channel portion at its upper end and a lateral flange at its lower end, a first clamping member provided with an inverted channel portion at its upper end guided by said bracket channel portion and a lateral flange at its lower end, a channel member in opposed relation to the channel portion of said first clamping member to thereby form a second clamping member, screw means carried by the lateral flange of said first clamping member and engageable with said second clamping member to thereby urge said clamping members toward each other to clamp a track element therebetween, and threaded means carried by the bracket flange engageable with said second clamping member to move both of said clamping members relative to said bracket when a track element is clamped therebetween.

6. In combination, a bracket adapted to be screwed to a fixed portion of a door frame, said bracket including a downwardly extending leg and a laterally extending flange at the lower end of said leg, first clamping means, means for confining said first clamping means to substantial vertical movement relative to said bracket, a track element having upper and lower sections, said first clamping means including an upper lateral portion for engaging the upper section of said track element, second clamping means for engaging the lower section of said track element, said first clamping means further including a laterally extending flange adjacent its lower end, threaded means carried by the flange on said first clamping means engageable with said second clamping means thereby to urge said second clamping means toward the upper lateral portion of said first clamping means to clamp said track element therebetween, and a screw carried by said bracket flange engaging with said second clamping means to move said second clamping means vertically relative to said bracket.

7. In combination, a C-shaped track for supporting slidable doors, a bracket for supporting said track in operative position including a downwardly facing channel portion at its upper end and forming a lateral flange at its lower end, upper and lower channeled clamping members, said upper clamping member being within said bracket channel portion and having downwardly directed legs, each leg provided with a lateral extension at its lower end, a screw carried by each lateral extension engageable with said lower clamping member to urge said lower clamping member toward said upper clamping member to thereby clamp said track therebetween and a screw carried by said bracket flange engageable with said lower clamping member to move said lower member, track and upper clamping member vertically relative to said bracket.

AUSTIN C. LOOMIS.

References Cited in the file of this patent

UNITED STATES PATENTS

| Number | Name | Date |
|---|---|---|
| 348,976 | Kasson | Sept. 14, 1886 |
| 534,966 | McCabe | Feb. 26, 1895 |
| 1,945,332 | Robinson | Jan. 30, 1934 |
| 2,230,615 | Dick | Feb. 4, 1941 |
| 2,293,841 | Long | Aug. 25, 1942 |